United States Patent
Kawanishi (10) Patent No.: US 9,116,646 B2
(45) Date of Patent: Aug. 25, 2015

(54) IMAGE FORMING APPARATUS, INFORMATION PROCESSING APPARATUS, PRINTING SYSTEM, METHOD OF CONTROLLING THE SAME, AND STORAGE MEDIUM FOR MANAGING PRINT JOBS

(71) Applicant: CANON KABUSHIKI KAISHA, Tokyo (JP)

(72) Inventor: Masaki Kawanishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/258,506

(22) Filed: Apr. 22, 2014

(65) Prior Publication Data

US 2014/0333953 A1    Nov. 13, 2014

(30) Foreign Application Priority Data

May 7, 2013   (JP) .................................. 2013-098000
Nov. 29, 2013  (JP) .................................. 2013-248338

(51) Int. Cl.
*G06K 15/00*   (2006.01)
*H04N 1/00*    (2006.01)
*G06F 3/12*    (2006.01)

(52) U.S. Cl.
CPC ............ *G06F 3/1238* (2013.01); *G06F 3/1203* (2013.01); *G06F 3/1222* (2013.01); *G06F 3/1267* (2013.01); *G06F 3/1274* (2013.01); *G06F 3/1285* (2013.01); *H04N 1/0035* (2013.01)

(58) Field of Classification Search
CPC ... G06F 3/1201; G06F 3/1204; G06F 3/1239; G06F 3/1289; G06F 3/1222; H04N 1/4406; H04N 1/444; H04N 2201/0094; H04N 2201/324; H04N 2201/3205; H04N 2201/3246; H04N 2201/32067
USPC ........ 358/1.1, 1.9, 1.13, 1.14, 1.15, 1.18, 402
See application file for complete search history.

(56) References Cited

U.S. PATENT DOCUMENTS

| | | | |
|---|---|---|---|
| 2007/0214494 A1* | 9/2007 | Uruta et al. | 726/2 |
| 2007/0282995 A1* | 12/2007 | Mizuno et al. | 709/223 |
| 2011/0134462 A1* | 6/2011 | Suto | 358/1.14 |
| 2012/0192264 A1* | 7/2012 | Sugiyama | 726/16 |
| 2012/0260350 A1* | 10/2012 | Yamada | 726/28 |

FOREIGN PATENT DOCUMENTS

JP    4033857 B   1/2008

* cited by examiner

*Primary Examiner* — Gabriel Garcia
(74) *Attorney, Agent, or Firm* — Carter, DeLuca, Farrell & Schmidt, LLP (57) ABSTRACT

An image forming apparatus, an information processing apparatus, a printing system, a method of controlling the same, and a storage medium. An image forming apparatus authenticates a user, transmits a request for a list of print jobs, and receives a list of print jobs transmitted in response to the request. The image forming apparatus displays on a display unit the list of print jobs received in the receiving, and in the displaying, a list of the print jobs, for which a user name of the user authenticated in the authenticating and a job owner name of the print job match, and a list of print jobs for which a job owner name is unknown is displayed.

7 Claims, 11 Drawing Sheets

| JOB NAME /300 | JOB OWNER NAME /302 | DATE/TIME /304 | |
|---|---|---|---|
| PrintJob1 | USER1 | 2012/02/03 14:20:30 | /306 |
| PrintJob2 | USER2 | 2012/02/03 14:22:00 | /308 |
| PrintJob3 |  | 2012/02/03 15:02:12 | /310 |
| PrintJob4 | USER4 | 2012/02/04 09:03:54 | /312 |
| PrintJob5 | USER2 | 2012/02/04 11:15:00 | /314 |
| PrintJob6 | USER6 | 2012/02/05 12:34:56 | /316 |

FIG. 3B

| JOB NAME | JOB OWNER NAME | DATE/TIME | |
|---|---|---|---|
| PrintJob2 | USER2 | 2012/02/03 14:22:00 | /308 |
| PrintJob5 | USER2 | 2012/02/04 11:15:00 | /314 |

FIG. 4A

| JOB NAME | JOB OWNER NAME | DATE/TIME | |
|---|---|---|---|
| PrintJob2 | USER2 | 2012/02/03 14:22:00 | 308 |
| PrintJob3 | | 2012/02/03 15:02:12 | 310 |
| PrintJob5 | USER2 | 2012/02/04 11:15:00 | 314 |
| PrintJob6 | USER6 | 2012/02/05 12:34:56 | 316 |

FIG. 4B

| Administrator |
|---|
| USER1 |
| USER2 |
| USER3 |
| USER4 |
| USER5 |

| USER NAME | JOB NAME | JOB OWNER NAME | DATE/TIME |
|---|---|---|---|
| USER2 | PrintJob3 | | 2012/02/03 15:02:12 — 310 |
| USER2 | PrintJob6 | USER6 | 2012/02/05 12:34:56 — 316 |

FIG. 9B

| USER NAME | JOB NAME | JOB OWNER NAME | DATE/TIME |
|---|---|---|---|
| USER2 | PrintJob3 | | 2012/02/03 15:02:12 |
| USER2 | PrintJob6 | USER6 | 2012/02/05 12:34:56 |
| | | | |

— 901  1/1
— 902  △
— 903  ▽
— 904  DETAILED INFORMATION

IMAGE FORMING APPARATUS, INFORMATION PROCESSING APPARATUS, PRINTING SYSTEM, METHOD OF CONTROLLING THE SAME, AND STORAGE MEDIUM FOR MANAGING PRINT JOBS

BACKGROUND OF THE INVENTION

1. Field of the Invention

The present invention relates to an image forming apparatus, an information processing apparatus, a printing system, a method of controlling the same, and a storage medium.

2. Description of the Related Art

In recent years, demand has been growing for authenticated printing in which a user transmits a print job to a print server, and printing is performed whenever the user likes on a desired printer, and also with guaranteed security (for example, Japanese Patent No. 4033857). By Japanese Patent No. 4033857, a user generates a print job and transmits it to a print server by a printer driver, and also transmits bibliographic information to a bibliography server. Then, upon printing by the printer, the printer obtains, and displays, a list of print jobs from the bibliography server, and the user makes an instruction for printing by selecting his or her own print job from the list. With this, the print instruction is dispatched from the bibliography server to the print server, and the print job is transmitted from the print server to the printer and printed by the printer.

However, in the printing system of Japanese Patent No. 4033857, the transmission of the print job by a printer driver is assumed. Also, in order to obtain, from the server, a print job list corresponding to a user, who succeeded in authentication, it is necessary that information for identifying the owner of a print job be included in the print jobs registered in the server. This was normally not a problem since the owner name of the print job was included in print jobs generated by a printer driver.

However, with print jobs that are generated without using a printer driver (a printing system which independently generates print data, or a direct printing system which directly interprets an application file and prints), there are cases in which the owner name of the print job is not included. In such a case, because the print job does not match an authenticated user name, it is not included in the list of print jobs acquired from the server. For this reason, a problem existed in that this kind of print job was left on the print server, and executed as a print job, or that its deletion could not be performed.

SUMMARY OF THE INVENTION

An aspect of the present invention is to eliminate the above-mentioned problems with the conventional techniques.

A feature of the present invention is to provide a technique in which additional information for specifying a print job is added to a request for a list of print jobs.

According to an aspect of the present invention, there is provided an image forming apparatus comprising an authentication unit configured to authenticate a user, a requesting unit configured to transmit a request for a list of print jobs, a receiving unit configured to receive a list of print jobs transmitted in response to the request by the requesting unit, and a display unit configured to display the list of print jobs received by the receiving unit. The display unit displays a list of the print jobs, for which a user name of the user that the authentication unit authenticated and a job owner name of the print job match, and a list of print jobs for which a job owner name is unknown.

According to another aspect of the present invention, there is provided a printing system including a printing apparatus, and an information processing apparatus that stores a list of print jobs. The printing apparatus comprises an authentication unit configured to authenticate a user, a requesting unit configured to transmit, to the information processing apparatus, a request for a list of print jobs, a receiving unit configured to receive, from the information processing apparatus, a list of print jobs transmitted in response to the request by the requesting unit, and a display unit configured to display the list of print jobs received by the receiving unit. The information processing apparatus comprises a storage unit configured to store a list of print jobs, an extraction unit configured to extract a print job corresponding to a print job specified by additional information included in the request from the print jobs stored by the storage unit, and a transmission unit configured to transmit to the printing apparatus a list of print jobs extracted by the extraction unit.

According to another aspect of the present invention, there is provided an information processing apparatus comprising a management unit configured to register, and manage as a list of print jobs, bibliographic information including at least a job owner name of a print job of one or more print jobs, a receiving unit configured to receive a request for a list of print jobs including additional information for specifying an authenticated user name and a print job, an extraction unit configured to extract a list of print jobs specifying the additional information from the list of print jobs that the management unit manages, and a transmission unit configured to transmit the list of print jobs that the extraction unit extracted to a device which is a dispatch origin of the request. The additional information includes information specifying a list of print jobs matching the authenticated user name, a list of print jobs for which the authenticated user name and a job owner name do not match, and a list of print jobs for which a job owner name is unknown.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
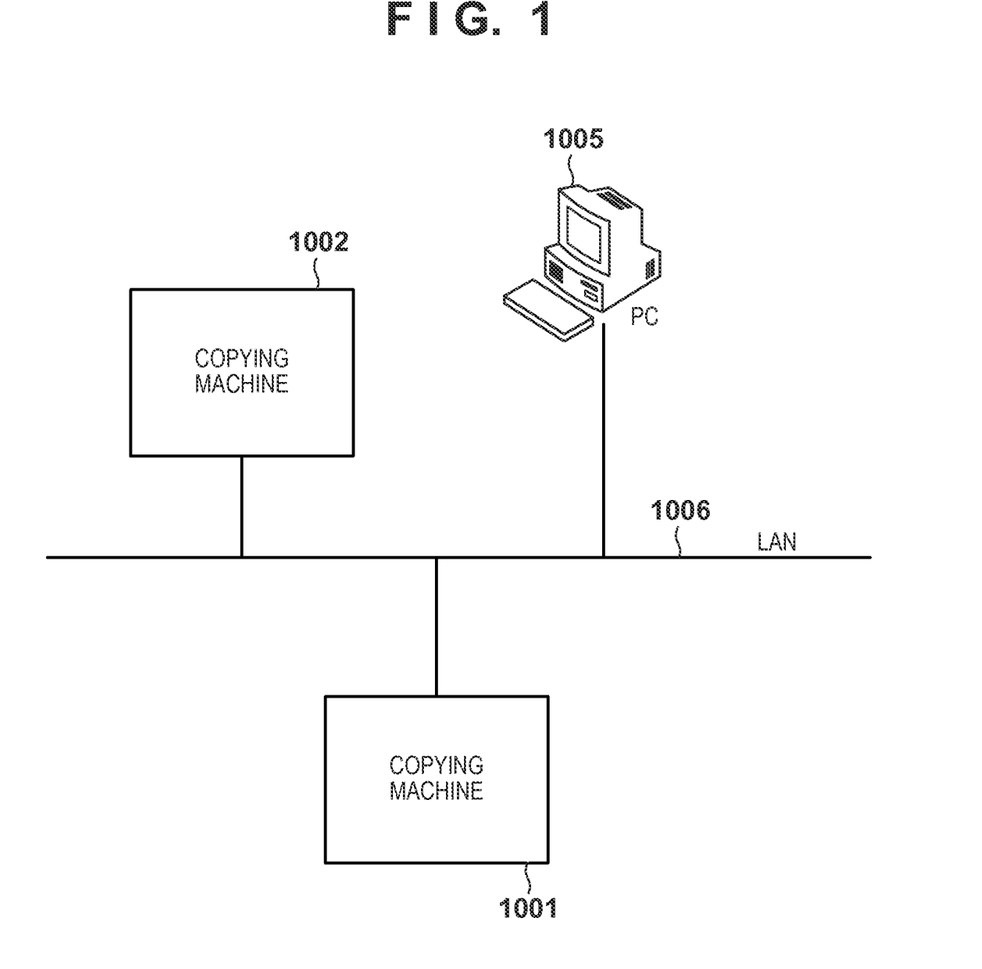
FIG. 1 is a view for showing schematically a configuration of a printing system including an image forming apparatus according to embodiments of the present invention.

FIG. 1 is a view for showing schematically a configuration of a printing system including an image forming apparatus according to embodiments of the present invention. In this embodiment, explanation will be given of a copying machine having a data transmission function as an example of an image forming apparatus, but the present invention is not limited to this kind of copying machine, and it is possible to adapt to a printing apparatus such as a printer.

A copying machine 1001, a copying machine 1002 having equivalent functions to the copying machine 1001, and a client computer (hereinafter referred to a PC) 1005, are placed on a LAN 1006 such as Ethernet (registered trademark). The copying machine 1001 has a copy function and a facsimile function, and also has a data transmission function for transmitting, to devices on the LAN 1006, image data of a scanned original, having scanned the original. Also, it has a PDL print function for printing having executed a print job defined in PDL which it received from the PC 1005, which is connected to the LAN 1006. Also, the copying machine 1001 has a box function for saving, into a box area, image data obtained by scanning of an original by the copying machine 1001, and image data obtained by processing a print job received from the PC 1005, which is connected to the LAN 1006. The image data saved to this box area can be printed. Also, the copying machine 1001 receives via the LAN 1006 image data obtained by the copying machine 1002 scanning an original, and saves the received image data to the copying machine 1001, and it also is able to print the received image data. The PC 1005 receives the image data from the copying machine 1001 via the LAN 1006, and may process or edit the received image data.

Figure 2:
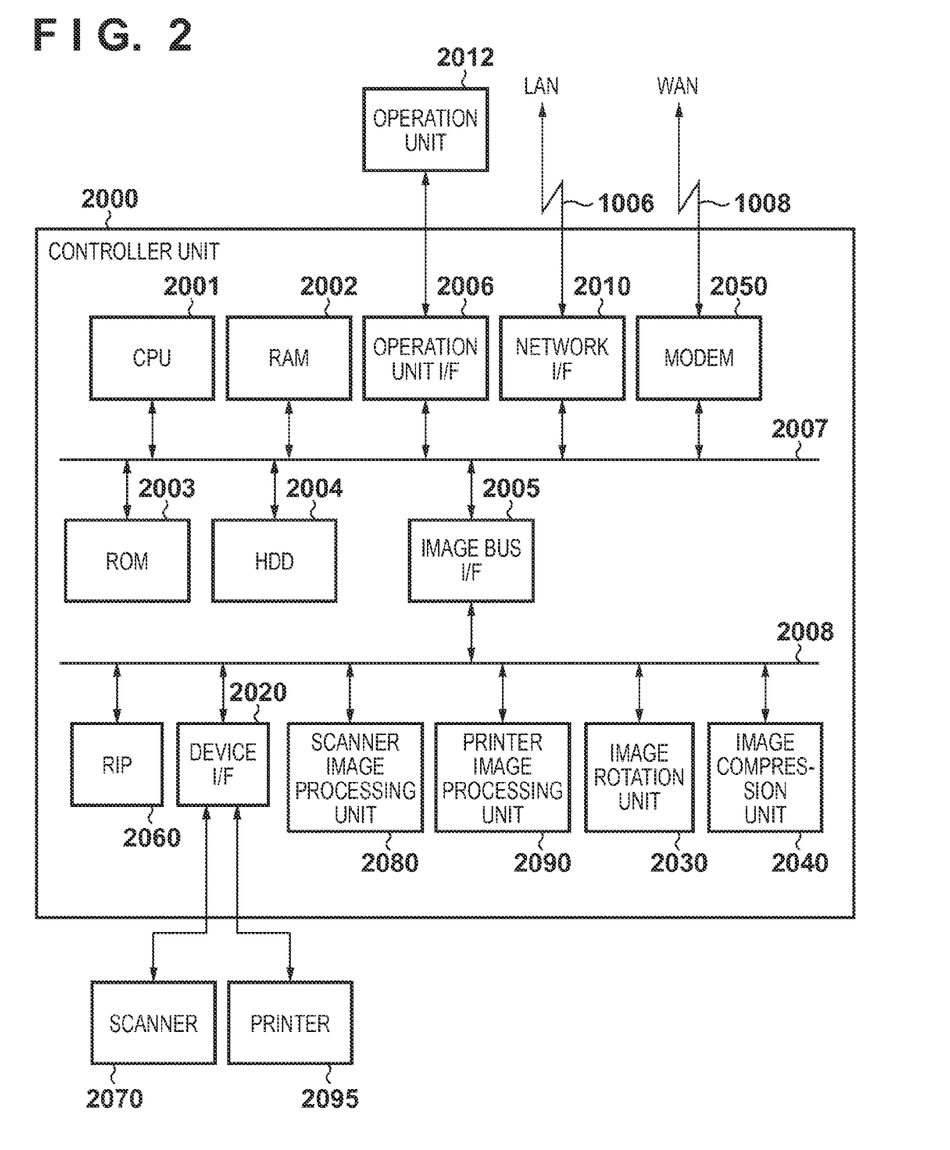
FIG. 2 is a block diagram for showing a functional configuration of a copying machine according to embodiments.

FIG. 2 is a block diagram for showing a functional configuration of the copying machine 1001 according to embodiments. Note, the copying machine 1002 has a similar configuration to the copying machine 1001 other than the fact that it does not function as a bibliography server, and so explanation is omitted.

A controller unit 2000 connects a scanner 2070, which is an image input device, and a printer 2095, which is an image output device. Also, the controller unit 2000 controls in order to realize a copy function of printing, with the printer 2095, image data obtained by scanning an original with the scanner 2070. Also, the controller unit 2000 transmits to the PC 1005, or the like, via the LAN 1006, image data obtained by the scanner 2070, and also prints, with the printer 2095, having received a print job from the PC 1005.

The controller unit 2000 has a CPU 2001, and the CPU 2001 starts up an operating system (OS) stored in an HDD 2004 with a boot program stored in a ROM 2003. Also, by executing application programs stored in the HDD 2004 on the OS, various processing is executed. A RAM 2002 is used as a work area of the CPU 2001. The RAM 2002, provides an image memory region for temporarily storing programs, image data, and the like, in addition to being a work area. The HDD (hard disk drive) 2004 is used for storing application programs and image data for the box function, and the like.

To the CPU 2001, via a system bus 2007, in addition to the ROM 2003 and the RAM 2002, an operation unit I/F (operation unit interface) 2006, a network I/F (network interface) 2010, and a modem 2050 are connected. Furthermore, an image bus I/F (image bus interface) 2005, which controls an interface with an image bus 2008, is connected. An operation unit I/F 2006 is an interface between a touch panel and an operation unit 2012 having hard keys, which outputs image data displayed on a display unit (not shown) of the operation unit 2012, to the operation unit 2012. Also, the operation unit I/F 2006 transmits, to the CPU 2001, information input by operation of the user on the operation unit 2012. A network I/F 2010 is connected to the LAN 1006, and performs input and output of information between devices on the LAN 1006 via the LAN 1006. The modem 2050 is connected to a public line 1008 (WAN), and performs input and output of information via the public line 1008.

An image bus I/F 2005 connects the image bus 2008 which transfers image data at high speed and the system bus 2007, and is a bus bridge for converting data configuration.

The image bus 2008 has a PCI bus or an IEEE 1394. On the image bus 2008, a raster image processor (hereinafter referred to as an RIP) 2060, a device I/F 2020, a scanner image processing unit 2080, a printer image processing unit 2090 and an image rotation unit 2030 and an image compression unit 2040 are arranged. The RIP 2060 is a processor for expanding intermediate language data into a bitmap image. To the device I/F 2020 are connected the scanner 2070 and the printer 2095, and the device I/F 2020 performs an image data conversion between synchronous and asynchronous systems.

The scanner image processing unit 2080 performs correction, processing and editing on image data input from the scanner 2070. The printer image processing unit 2090 performs image correction, half-tone processing, and the like on the image data to be printed. The image rotation unit 2030 performs rotation of image data. The image compression unit 2040 compresses multi-valued image data into JPEG data, and binary image data into JBIG data, MMR data, MH data, or the like, and also conversely performs expansion processing.

[First Embodiment]

For the first embodiment, explanation will be given with the presupposition that a plurality of PDL print jobs (hereinafter referred to as print jobs) are input, from the PC 1005 or another client computer (not shown) connected to the LAN 1006, and stored in the copying machine 1001 or the copying machine 1002. Note, in the first embodiment, explanation will be given with the copying machine 1001 having a configuration having a bibliography server function, but because a bibliography server (information processing apparatus) may be connected to the LAN 1006 as a separate device, and this does not limit the function or the configuration of the present invention.

In the first embodiment, the copying machine 1001 has a function as a bibliography server, and stores and manages the input plurality of print jobs of the copying machine 1001. Next, explanation will be given for cases in which a list of print jobs of a user who authenticated on a device which requests a list of print jobs (the copying machine 1002), or print jobs other than those of the user who authenticated, and print jobs of a user who cannot use the device, which is the request source, is acquired. Note, configuration may be taken such that, other than this, the request source device can obtain only a list of the print jobs for users other than those who authenticated, for example. Alternatively, configuration may be taken such that only a list of print jobs of users that cannot use the request source device or print jobs of users capable of using the request source device can be obtained.

Figure 3A:
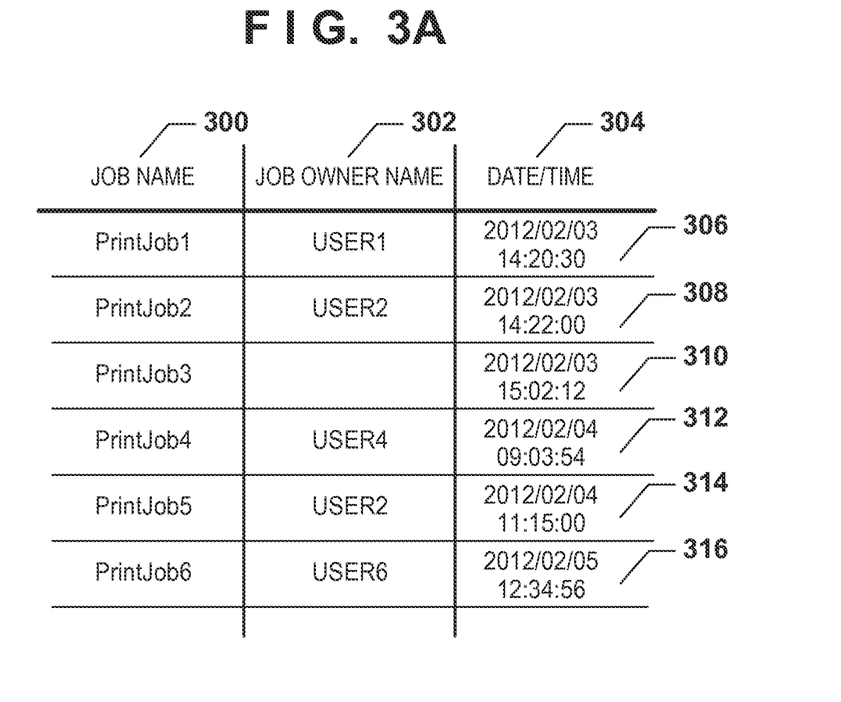
FIG. 3A is a view for illustrating an example of a list of print jobs that a copying machine manages according to a first embodiment.

FIG. 3A is a view for illustrating an example a list of print jobs that the copying machine 1001 manages according to a first embodiment.

This list of print jobs is shown as a collection of a plurality of items of bibliographic information. The bibliographic information is generated when, for example, a print job is input into the copying machine 1001 from the PC 1005, and the copying machine 1001 processes the print job. The bibliographic information is generated based on the input print job and "device information" that the copying machine 1001 retains. The bibliographic information is managed as a list of print jobs stored in the RAM 2002. In this way, the copying machine 1001 has a function as a bibliography server.

In FIG. 3A, a job name 300 is a name of a print job which uniquely identifies the print job. The job name is information which is included in the received print job. Note, in cases where the job name is not included in the print job, the copying machine 1001 may generate and attach one. A job owner name 302 is information for identifying the user who generated the print job. The job owner name is information included in the print job, and in cases where it is not included in the print job, the job owner name may not exist. A date/time 304 expresses the date and the time when the print job is input. In FIG. 3A, six pieces of bibliographic information are stored with the job names "PrintJob1"-"PrintJob6".

For example, bibliographic information 306 represents the job name "PrintJob1", the job owner name "USER1", and the date time when the print job was input "2012/02/03, 14:20:30". Here, the job owner name 302 of bibliographic information 310 is empty, and this represents the fact that the owner name of the job is not included in the print job. Here, the examples of the job name 300, the job owner name 302, and the date/time 304 are given as the bibliographic information, but the bibliographic information is not limited to this. For example, print settings such as a color/monochrome setting of the print job, and settings for a number of pages, or a number of copies of the print job may be included as bibliographic information. In the first embodiment, explanation will be given for operation of the copying machine 1001 in cases where the copying machine 1002 makes a request for a list of print jobs to the copying machine 1001, which has a bibliography server function.

Figure 3B:
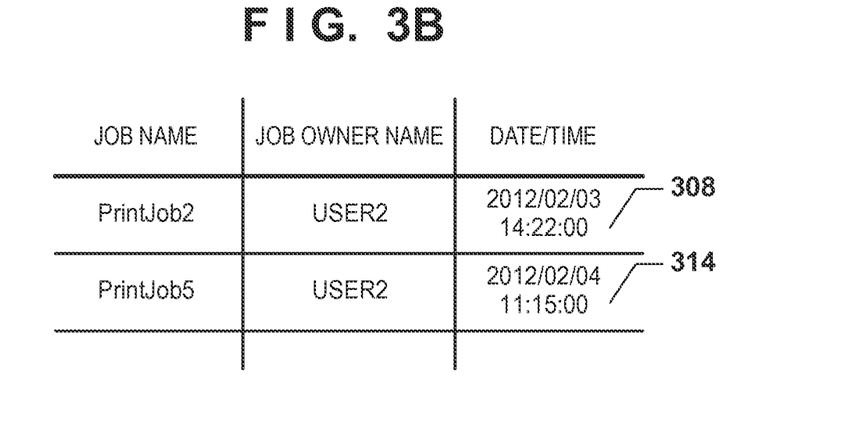
FIG. 3B is a view for illustrating an example of a print job list sent in reply when the copying machine receives a request for the print job list.

FIG. 3B is a view for illustrating an example in which, for example, an authenticated user name is "USER2", and a print job list that the copying machine 1001 sends in reply when it receives a request for the print job list for the list of print jobs shown in FIG. 3A.

In FIG. 3A, out of the bibliographic information 306-bibliographic information 316, the bibliographic information 308 and the bibliographic information 314 are the ones for which the job owner name is "USER2". Accordingly, for a print job list request, a list of print jobs including the bibliographic information 308 and 314 will be transmitted from the copying machine 1001 to the request source which is the copying machine 1002.

Figure 5:
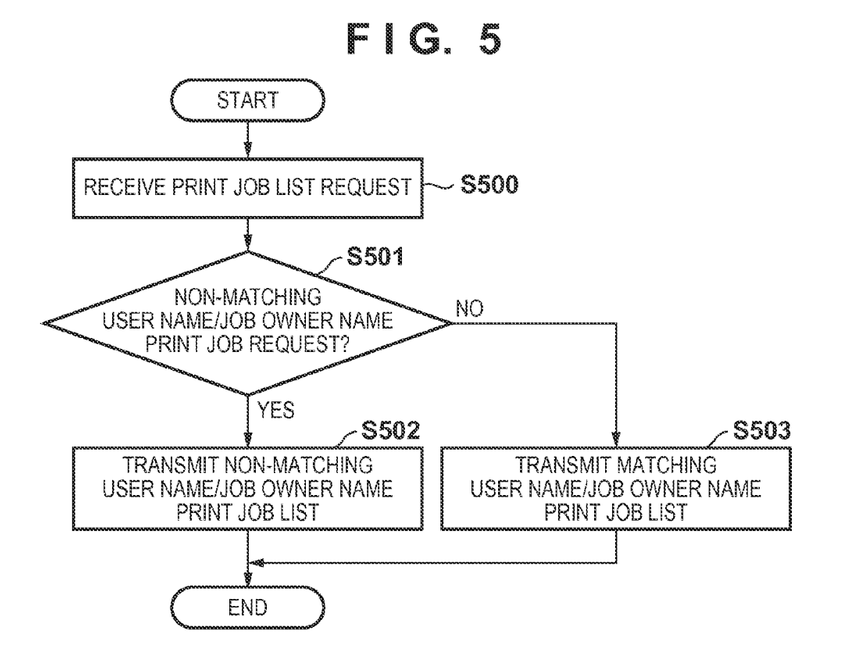
FIG. 5 is a flowchart for describing processing by the copying machine operating as the bibliography server in the first embodiment.

FIG. 5 is a flowchart for describing processing by the copying machine 1001 operating as the bibliography server in the first embodiment. The processing illustrated by the flowchart is realized by the CPU 2001 executing a program loaded into the RAM 2002 from the HDD 2004.

Firstly, in step S500, the CPU 2001, when it receives a request for a list of print jobs from the copying machine 1002 via the LAN 1006, proceeds to the processing of step S501. Note, the communication protocol in this case may be an independently developed one, or may be a general one, and it is not stipulated specifically here. In step S501, the CPU 2001 determines whether or not the request includes first additional information specifying a print job list including the print jobs whose job owner name of the print job does not match an authenticated user name or whose user cannot use the copying machine 1002. In step S501, in a case where it is determined that the first additional information is included, the processing proceeds to step S502, and when that is not the case, the processing proceeds to step S503. In step S502, the CPU 2001 extracts the print jobs whose job owner name of the print job does not match an authenticated user name or whose user cannot use the copying machine 1002, transmits the list of print jobs to the copying machine 1002 via the LAN 1006 and completes the processing.

On the other hand, in step S503, the CPU 2001 transmits a list of print jobs whose job owner name of the print job matches an authenticated user name to the copying machine 1002 via the LAN 1006 and completes the processing. Note, the list of print jobs transmitted in step S503 is a list as shown in the previously described FIG. 3B, for example.

Figure 4A:
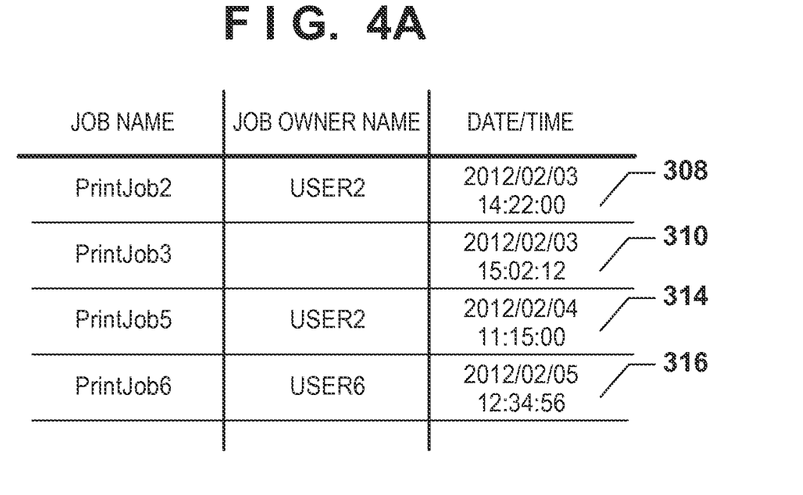
FIG. 4A is a view for illustrating an example a print job list that the copying machine sends in reply in a case where it receives a request for the print job list in the first embodiment.
Figure 4B:
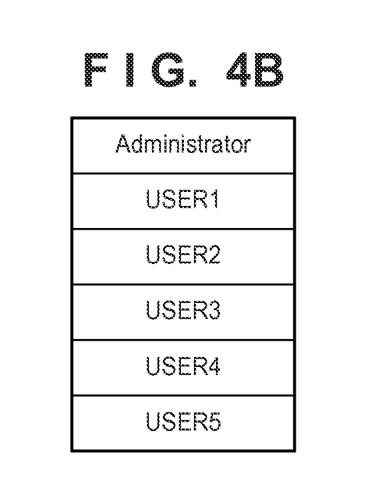
FIG. 4B is a view for illustrating an example a list of users capable of using the copying machine according to the first embodiment.

FIG. 4B is a view for illustrating an example a list of users capable of using the copying machine 1002 according to the first embodiment.

The list of users capable of using the copying machine 1002 is stored beforehand in the HDD 2004 of the copying machine 1001, or the like, or received from the copying machine 1002 or a server (not shown) at a particular timing and stored in the RAM 2002, or the like. Here, an administrator and a plurality of users (USER1-USER5) are registered.

Figure 6:
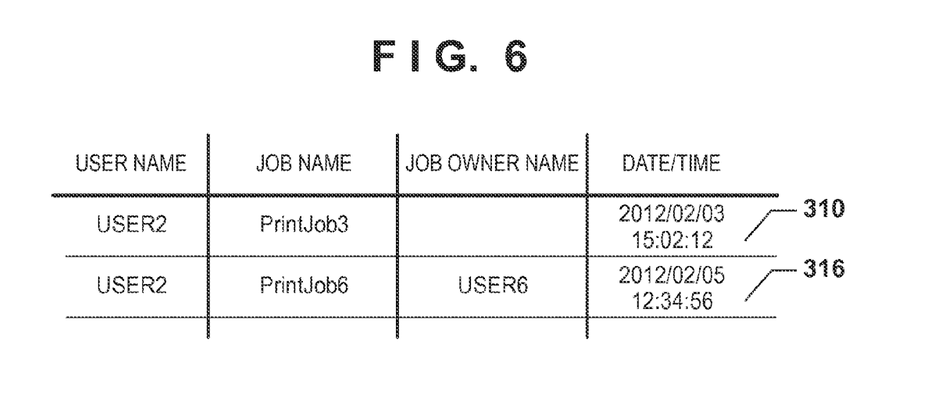
FIG. 6 is a view for illustrating an example of a list of print jobs transmitted in step S502 of FIG. 5 in response to a request for a list of print jobs in the first embodiment.

FIG. 6 is a view for illustrating an example of a list of print jobs transmitted in step S502 of FIG. 5 in response to a request for a list of print jobs from the copying machine 1002 when the copying machine 1001 has the list of print jobs shown in FIG. 3A.

Here, the user name authenticated on the copying machine 1002 is "USER2". Here, explanation will be given for cases in which a request is received including first additional information specifying a list of print jobs whose job owner name of the print job does not match an authenticated user name or whose user cannot use the copying machine 1002.

In FIG. 3A, the bibliographic information 306 has a job owner name of "USER1", which is different to "USER2", the user name authenticated on the copying machine 1002. However, because the user "USER1", as shown in FIG. 4B, is a user capable of using the copying machine 1002, it is not included in the list of print jobs requested this time.

Also, because the bibliographic information 308 and 314 of FIG. 3A have a job owner name of "USER2" which matches the authenticated user name "USER2", they are not included in the list of print jobs requested this time.

Also, for the bibliographic information 310 of FIG. 3A, no job owner name exists, and so this is different to the authenticated user name "USER2", and the user is not capable of using the copying machine 1002. Accordingly, this is included in the list of print jobs requested this time.

Also, bibliographic information 312 of FIG. 3A has a job owner name of "USER4" which is different to the user name "USER2" authenticated on the copying machine 1002. However, because the user is capable of using the copying machine 1002 as illustrated in FIG. 4B, this is not included in the list of print jobs requested this time.

Also, bibliographic information 316 has a job owner name of "USER6", which is different to the authenticated user name "USER2", and because the user is not capable of using the copying machine 1002 in FIG. 4B, this is included in the list of print jobs requested.

FIG. 4A is a view for illustrating an example a print job list that the copying machine 1001 sends in reply in a case where it receives a request for a print job list from the copying machine 1002 when the user name authenticated on the copying machine 1002 is "USER2" for the list of print jobs shown in FIG. 3A.

In the first embodiment, the request includes second additional information specifying a list of print jobs whose job owner name of the print job matches an authenticated user name, and print jobs whose job owner name of the print job does not match and whose user cannot use the copying machine 1002.

In such a case, out of the bibliographic information 306-316 of FIG. 3A, the bibliographic information 308 and the bibliographic information 314 are the bibliographic information having "USER2" for a job owner name. Accordingly, "Printjob2" and "Printjob5", which correspond to the bibliographic information 308 and the bibliographic information 314, are included in the list of print jobs. Also, the bibliographic information 310 and the bibliographic information 316 have different job owner names to "USER2" and are not of users capable of using the copying machine 1002. Accordingly, "Printjob3" and "Printjob6" which correspond to the bibliographic information 310 and the bibliographic information 316 are included in the list of print jobs.

As explained above, by virtue of the first embodiment, it is possible to obtain, from out of the plurality of print jobs registered, only print jobs whose owner is an authenticated user, or only print jobs of owners other than the authenticated user. Also, it is possible to configure so that when this kind of list of jobs is requested, print jobs of users capable of using the request source device or print jobs of users who cannot use the request source device are included.

[Second Embodiment]

Next, explanation will be given for a second embodiment of the present invention. In the second embodiment, explanation will be given for operation of the copying machine 1002 when a request for a list of print jobs is made from the copying machine 1002 to the copying machine 1001, which has a bibliography server function. Note, because the configurations of the copying machines 1001 and 1002 and the configuration of the printing system according to the second embodiment are the same as in the previously described first embodiment, their explanation will be omitted.

Figure 7A:
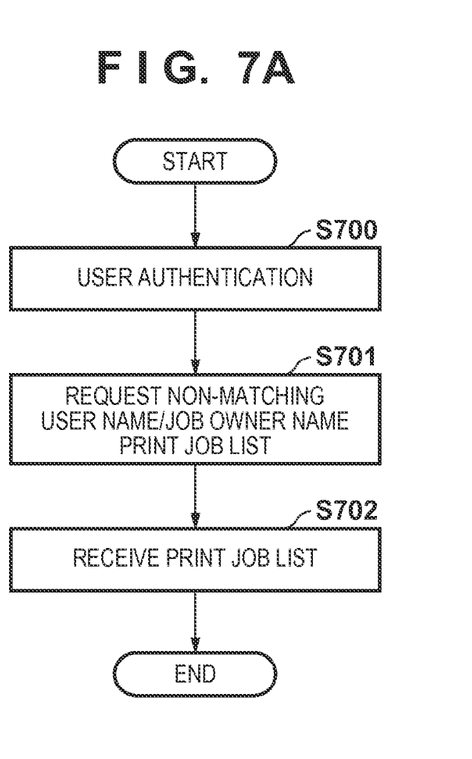
FIG. 7A is a flowchart for describing processing of a copying machine according to a second embodiment.

FIG. 7A is a flowchart for describing processing of the copying machine 1002 according to the second embodiment. The processing illustrated by the flowchart is realized by the CPU 2001 of the copying machine 1002 executing a program loaded into the RAM 2002 from the HDD 2004 of the copying machine 1002.

Firstly, in step S700, the CPU 2001 performs authentication of the user, and the processing proceeds to step S701. In step S700, regarding the user authentication, as long as the user name can be acquired, any method can be used. For example, a method may be used in which the CPU 2001 displays a user authentication screen (not shown) on a display unit of the operation unit 2012 via the operation unit I/F 2006, input information of a user name and a password is obtained via the operation unit I/F 2006, and the user is authenticated. Also, a method may be used in which user information is obtained from a card reader (not shown), or the like, that the copying machine 1002 is equipped with.

In step S701, the CPU 2001 transmits to the copying machine 1001 a request including first additional information requesting a list of print jobs not matching the user name obtained in step S700, or the authenticated user name and the job owner name and whose user cannot use the copying machine 1002. Then, in step S702, the CPU 2001 receives the requested list of print jobs from the copying machine 1001 via the LAN 1006, and the processing completes.

Figure 8:
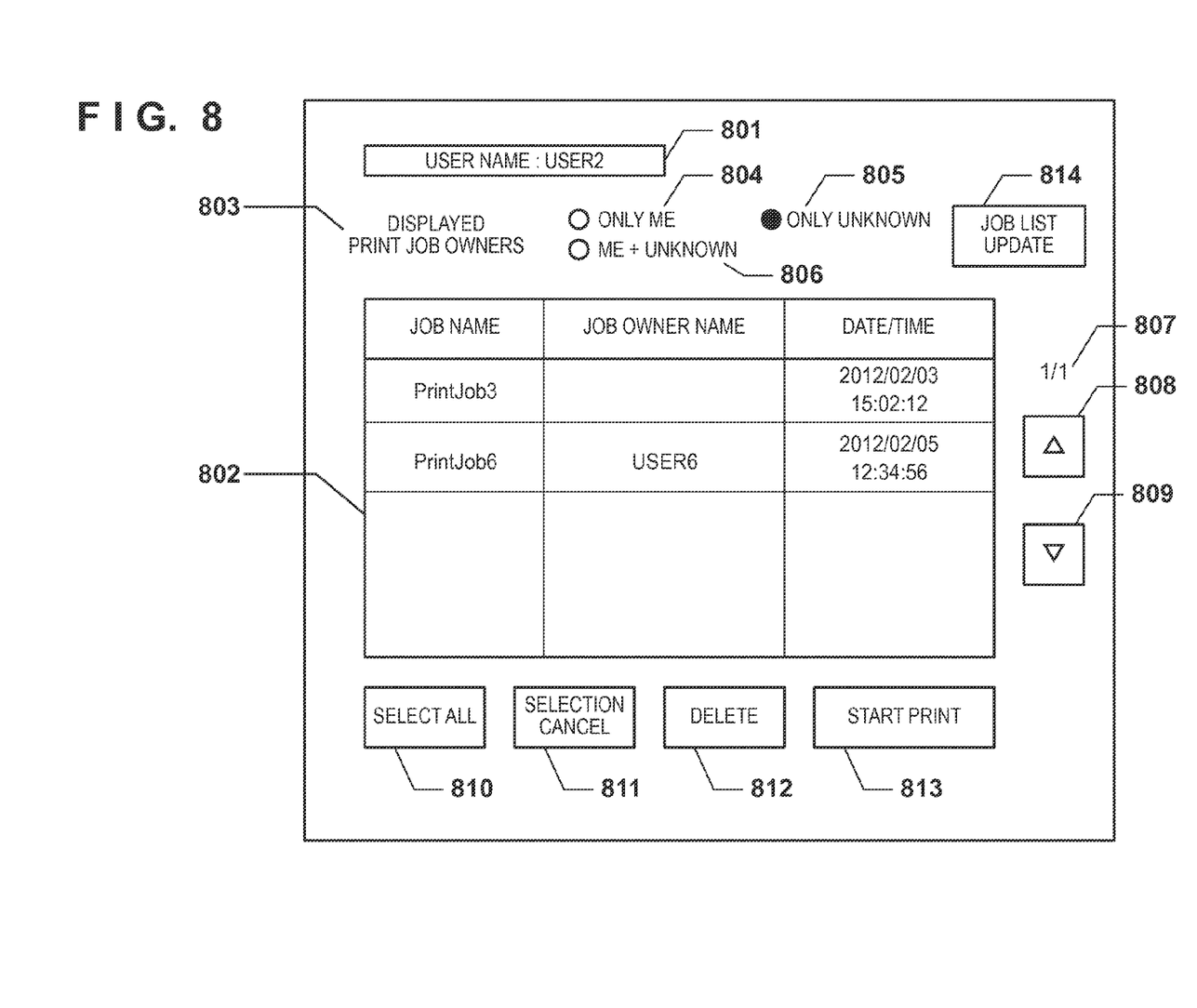
FIG. 8 is a view for illustrating an example of a screen for displaying a list of print jobs that the copying machine received in the second embodiment.

FIG. 8 is a view for illustrating an example of a screen for displaying a list of print jobs that the copying machine 1002 received in the second embodiment. The screen shows an example that the CPU 2001 generates based on the list of print jobs that it obtains in step S702 of FIG. 7A, and displays on the display unit of the operation unit 2012 via the operation unit I/F 2006. Reference numeral 801 denotes a field for displaying the user name of the user authenticated on the copying machine 1002. In the second embodiment the authenticated the user name is "USER2". Here in a print job display field 802, as illustrated in FIG. 6, a corresponding print job list is displayed.

Reference numeral 803 denotes a character string prompting selection of the owner of the print jobs to display. Reference numerals 804-806 each displays a menu item for selecting the owner of the print jobs to display, and each is selectable with a radio button. Here, the menu item is controlled so that only one can be selected. So long as this control is performed, the configuration of the menu is not limited to radio buttons, and may be realized by a pull-down list, or the like.

An item "only me" 804 is selected in cases where the user wishes to display only a list of print jobs matching the user name 801. In an initial state, the item "only me" 804 is selected. An item "only unknown" 805 is selected in cases where the user wishes to display only a list of print jobs that do not match the user name 801. An item "me+unknown" 806 is selected in cases where the user wishes to display a list of print jobs for both print jobs matching the user name 801, and print jobs that do not match the user name 801. In the print job list screen of FIG. 8, the state is such that the item "only unknown" 805 is selected. Accordingly, a list of print jobs as shown in FIG. 6 is acquired from the copying machine 1001.

Reference numeral 807 represents a currently displayed number of pages and the total number of pages. In FIG. 8, the first page out of a total of 1 page is displayed. Reference numeral 808 denotes a button for displaying the preceding page, and reference numeral 809 denotes a button for displaying the next page. A select-all button 810 is used to select all of the bibliographic information displayed in the list of print jobs. A selection cancel button 811 is used for cancelling a selection of selected bibliographic information. A delete button 812 is used for deleting selected bibliographic information. The print job information deleted in this way may be sent from the copying machine 1002 to the copying machine 1001 and used for deleting a corresponding print job on the copying machine 1001. A print initiation button 813 is used when printing of selected bibliographic information is initiated. The job list update button 814, when pressed, transmits to the copying machine 1001 a request for a list of print jobs including additional information generated based on information of the selected one out of the items "only me" 804, "only unknown" 805, and "me+unknown" 806.

With this, the copying machine 1002 according to the second embodiment receives a print job list matching that request from the copying machine 1001, and updates the print job list screen based on the received print job list.

As explained above, by the second embodiment, a request can be dispatched by setting conditions of the print jobs included in print job list in the device that requests the print job list.

Because of this, it is possible to obtain a list of only print jobs of the user that authenticated on the device, or only print jobs where the user name is unknown, or print jobs of the user that authenticated on the device and print jobs where the user name is unknown, for example. Furthermore, it is possible to obtain only the print jobs of users capable of using the dispatch origin device of the request, or only the print jobs of users other than those capable of using the dispatch origin device.

[Third Embodiment]

Next, explanation will be given for a third embodiment. In the third embodiment, explanation will be given for processing for requesting a list of print jobs from the copying machine 1002 to the copying machine 1001, which has a bibliography server function and printing. Note, because the configurations of the copying machines 1001 and 1002 and the configuration of the printing system according to the third embodiment are the same as in the previously described first embodiment, their explanation will be omitted.

Figure 7B:
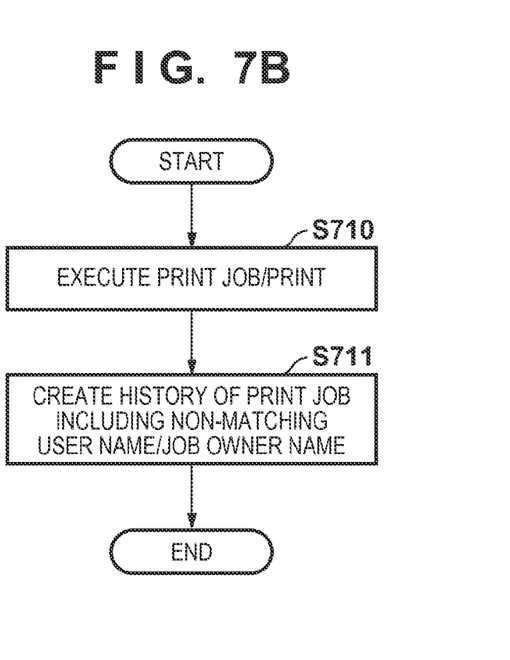
FIG. 7B is a flowchart for describing processing of a copying machine according to a third embodiment.

FIG. 7B is a flowchart for describing processing of the copying machine 1002 according to the third embodiment. The processing illustrated by the flowchart is realized by the CPU 2001 of the copying machine 1002 executing a program loaded into the RAM 2002 from the HDD 2004 of the copying machine 1002.

Firstly, in step S710, the CPU 2001 executes printing of the print job associated with the job name of the selected bibliographic information, when the CPU 2001 detects that the print initiation button 813 (FIG. 8) is pressed via the operation unit I/F 2006. Then, the processing proceeds to step S711, the CPU 2001 generates history of the print job including the authenticated user name, and the job owner name of the print job, and the processing completes.

Figure 9A:
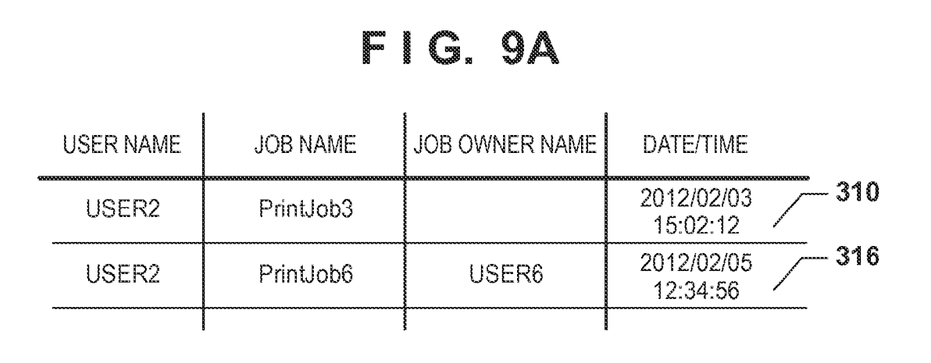
FIG. 9A is a view for illustrating an example of print job history according to the third embodiment.

FIG. 9A is a view for illustrating an example of print job history according to the third embodiment.

This shows the history of print jobs and is for when the print job with the job name "Printjob3", and the print job with the job name "Printjob6" were executed from the print job list screen shown in FIG. 8. Here, in all of the histories, the user name is "USER2", which is the user name of the user that authenticated on the copying machine 1002.

Figure 9B:
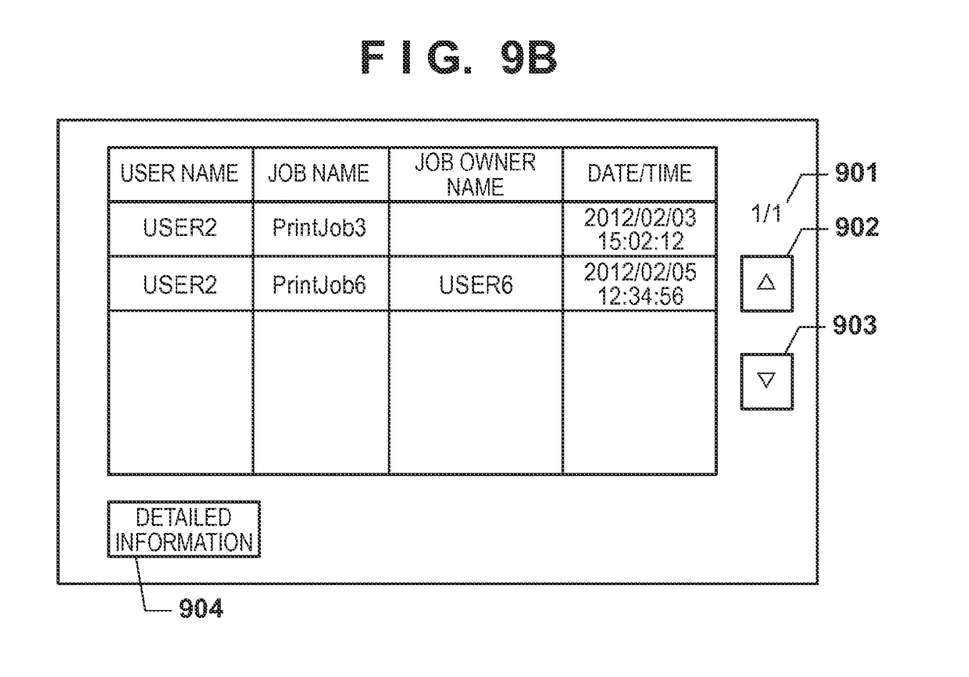
FIG. 9B is a view for illustrating an example of a print job history screen according to the third embodiment.

FIG. 9B is a view for illustrating an example a print job history screen.

The print job history screen is something that the CPU 2001 generates based on the history of the print jobs obtained in step S711, and that is displayed on the display unit of the operation unit 2012 via the operation unit I/F 2006. Here, as illustrated in FIG. 9A, the user name, the job name, the job owner name, and the date/time of the print job history are displayed.

Reference numeral 901 denotes the currently displayed page number and the total number of pages. Here the first page out of a total of one page is displayed. Reference numeral 902 denotes a button for displaying the preceding page and reference numeral 903 denotes a button for displaying the next page. A detailed information button 904 is used for when the user wishes to display a screen of detailed information (not shown) of the selected print job history output page number.

Here, the examples of the user name, the job name, the job owner name, and the date/time are given as the print job history, but the print job history is not limited to this. For example, information that shows whether or not an output result of the print job was normal, or the like, may be included as the print job history.

Also, the user name may also be displayed on the detailed information screen displayed when the detailed information button 904 is pushed. Also, by executing billing processing in association with the user name, billing for the user that actually executed the print becomes possible.

As explained above, by the third embodiment, history that print jobs were executed can be generated, in association with the users that executed the print jobs, and displayed.

[Fourth Embodiment]

For the previously described first embodiment, explanation was given with the presupposition that PDL print jobs are input, from the PC 1005 or another client computer (not shown) connected to the LAN 1006, and stored in the copying machine 1001 or the copying machine 1002. In contrast to this, in a fourth embodiment, explanation will be given for an embodiment in which, when a print job input from another client computer is saved (stored), the existence or absence of a stored print job having a user name that cannot be identified is determined.

In the fourth embodiment, explanation will be given for an example in which a PDL print job from the client computer 1005 is input into the copying machine 1001. Note, because the configurations of the copying machines 1001 and 1002 and the configuration of the printing system according to the fourth embodiment are the same as in the previously described first embodiment, their explanation will be omitted.

Figure 10:
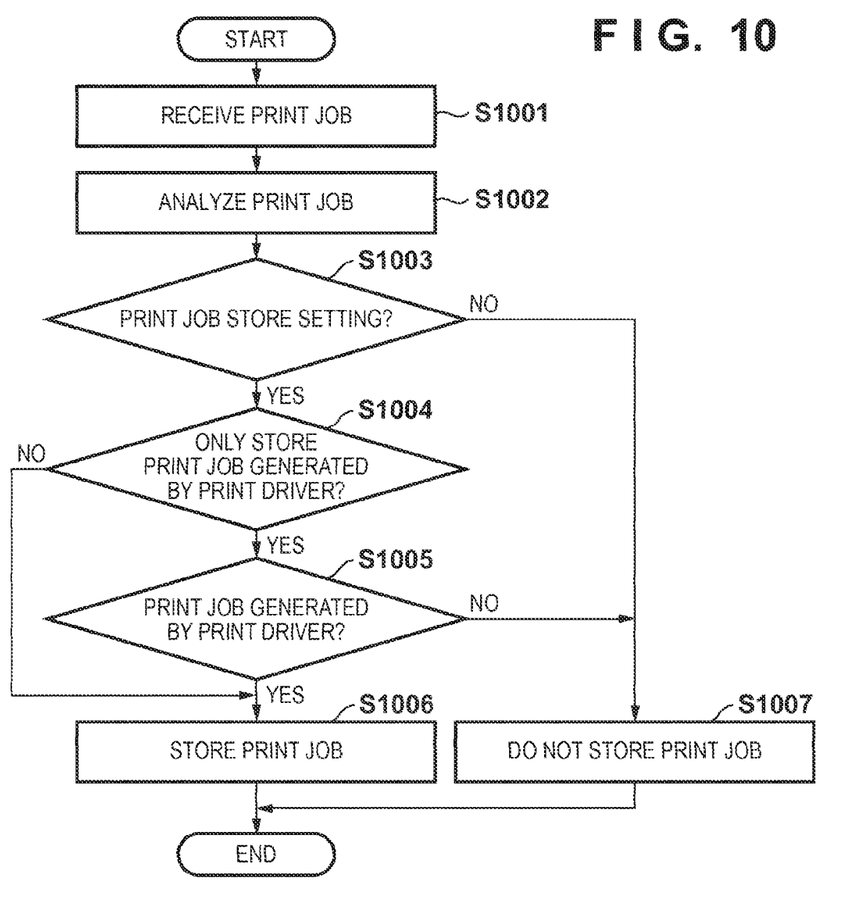
FIG. 10 is a flowchart for describing print processing by the copying machine according to a fourth embodiment of the present invention.

FIG. 10 is a flowchart for describing print processing by the copying machine 1001 according to the fourth embodiment of the present invention. The processing illustrated by the flowchart is realized by the CPU 2001 executing a program loaded into the RAM 2002 from the HDD 2004.

Firstly, in step S1001, the CPU 2001, when it receives a print job from the client computer 1005 via the LAN 1006, proceeds to the processing of step S1002. Note, the communication protocol for receiving the print job may be an independently developed one, or may be a general one, and it is not stipulated specifically here. In step S1002, the CPU 2001 analyzes the received print job and the processing proceeds to step S1003. Normally, the print job includes a job control command such as a print setting, and a PDL (page description language) command which describes the content of the print job. The job control command may be of PJL by Hewlett-Packard, CPCA (Common Peripheral Controlling Architecture), by Canon, or the like, for example. Also the PDL command may be of Postscript by Adobe or LIPS (LBP Image Processing System) by Canon, or the like. Any of the above may be used, and no particular limitation is made. Also, configuration may be taken such that a job control command is not added, and in such a case the print processing is executed by analyzing only the PDL command.

In step S1003, and the CPU 2001 determines whether or not a print setting for forcibly storing the print job on the copying machine 1001 is valid, out of the print settings of the copying machine 1001 stored in the RAM 2002, or the like. When it is determined that the print setting is valid, the processing proceeds to step S1004, and in a case where it is determined that this is not the case, the processing proceeds to step S1007, and setting is made so that the print job is not stored. In step S1004, the CPU 2001 determines whether or not a print setting for storing only the print jobs generated by the printer driver is valid, out of the print settings of the copying machine 1001 stored in the RAM 2002, or the like. When it is determined that this kind of print setting is valid, the processing proceeds to step S1005, and in a case where it is determined that this is not the case, the processing proceeds to step S1006.

Figure 11:
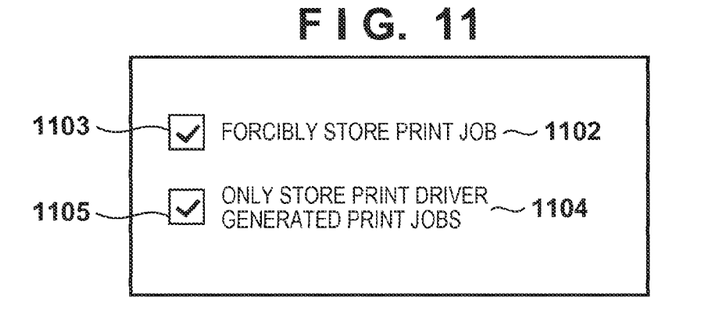
FIG. 11 is a view for illustrating an example of a print setting screen according to the fourth embodiment.

Note, the above described print setting is set by the CPU 2001 displaying a screen as shown in FIG. 11 on the operation unit 2012 via the operation unit I/F 2006, and receiving, via the operation unit I/F 2006, the information that the user input on that screen. Information set in this way is reflected by the CPU 2001 storing it in the RAM 2002 as a print setting.

FIG. 11 is a view for showing an example of the print setting screen according to the fourth embodiment.

An item 1102 sets so as to store print jobs forcibly. By checking a check-box 1103, the setting becomes valid, and by removing the check of the check-box 1103, the setting becomes invalid. An item 1104 sets that only print jobs generated by a printer driver be stored. By checking a check-box 1105, the setting becomes valid, and by removing the check of the check-box 1105, the setting becomes invalid. The print setting screen of FIG. 11 shows an example in which both of the settings are valid.

In step S1005, the CPU 2001 determines whether or not the print job is generated by the printer driver. In step S1005, in a case where the CPU 2001 determines that the print job is generated by the printer driver, the processing proceeds to step S1006, and the CPU 2001 controls so that the print job is stored, and when that is not the case the processing proceeds to step S1007. When the printer driver generates a print job, the printer driver always adds to the job control command a particular command that indicates that the printer driver generated the print job. Because of this, the CPU 2001, by determining whether or not the particular command is added to the job control command, can determine whether or not the print job is generated by the printer driver. Note, here, explanation was given for an example in which a particular command is added to the job control command, but the particular command may be added to the PDL command, or may be both the job control command and the PDL command.

In step S1006, the CPU 2001 stores the received print job in a storage apparatus such as the RAM 2002 or the HDD 2004, and the processing completes. Regarding print jobs stored in the storage apparatus in this way, the print job can be printed or can be deleted in accordance with an instruction by the user, as long as the user performs authentication on the copying machine 1001, and the authentication of the user succeeds.

On the other hand, in step S1007, the CPU 2001 cancels the print processing by the print job without storing the received print job to the storage apparatus. Specifically, the CPU 2001 discards the received print data, and as well as writing an error log to the HDD 2004, prints an error report on the printer 2095. The error report includes such things as an error code indicating a type of the error, a received date time, and bibliographic information. Also, configuration may be taken so as to also print a message such as "cannot print or save because the user is unknown", for example.

As explained above, by the fourth embodiment, it is possible to configure so that in cases where setting is performed so as to store the received print job in the apparatus when the print job is received, only print jobs generated by the printer driver are stored in accordance with the setting.

[Fifth Embodiment]

In the above described fourth embodiment, explanation was given for an example in which, in a case where it is determined that data of the received print job (print data) is not generated by the printer driver, print processing is cancelled without storing the print data. In contrast to this, in the fifth embodiment, explanation will be given for an example in which it is settable whether or not the print data is cancelled in cases where the job owner name (document inputter) included in the received print data is not analyzable. Note, because the configurations of the copying machines 1001 and 1002 and the configuration of the printing system according to the fifth embodiment are the same as in the previously described first embodiment, their explanation will be omitted.

Figure 12:
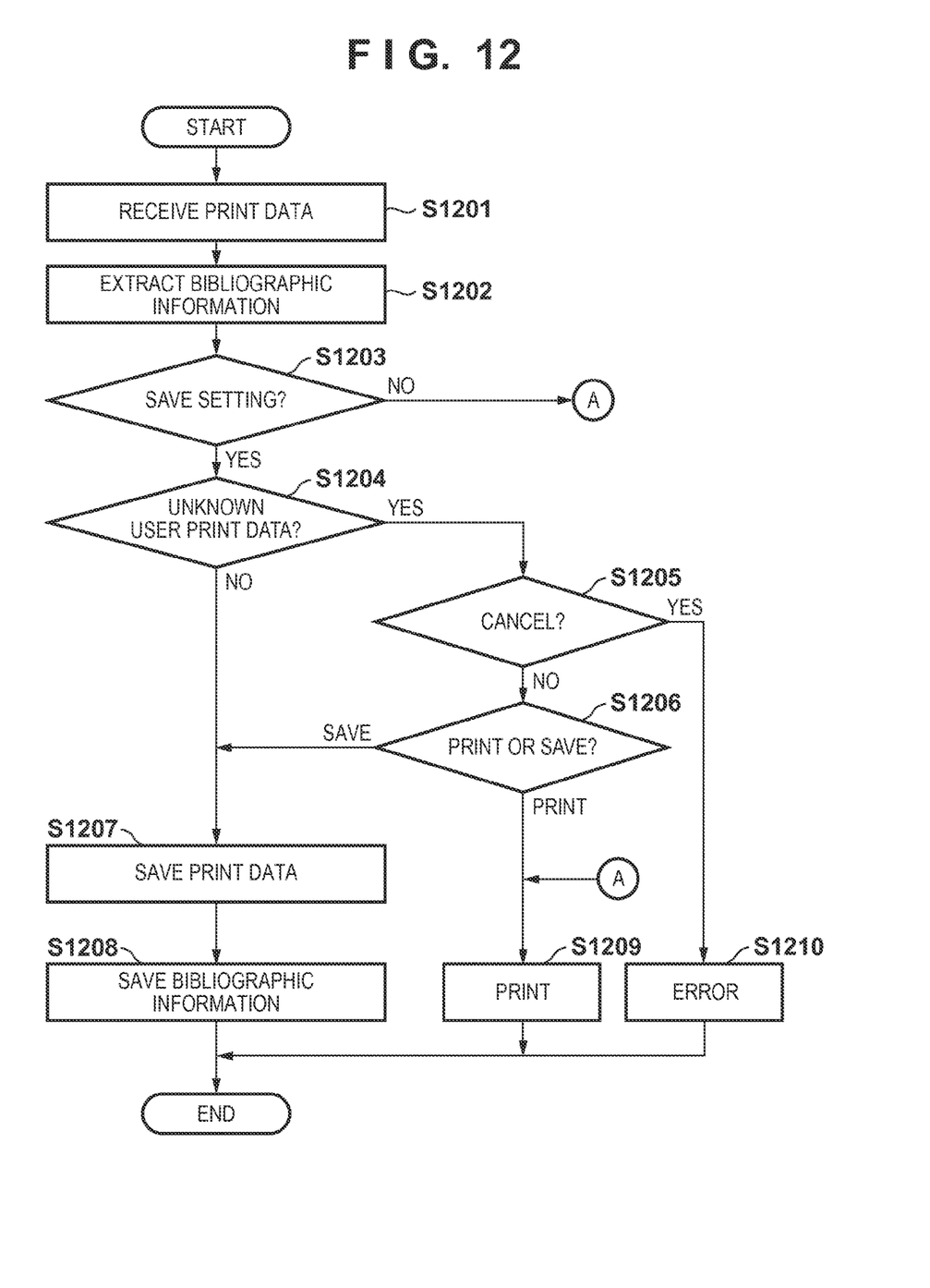
FIG. 12 is a flowchart for describing processing in a case where the copying machine received print data according to the fifth embodiment.

FIG. 12 is a flowchart for describing processing in a case where the copying machine 1001 received print data according to the fifth embodiment. The processing illustrated by the flowchart is realized by the CPU 2001 executing a program loaded into the RAM 2002 from the HDD 2004. Note, the processing illustrated by the flowchart is initiated upon the receipt of print data transmitted from the PC 1005.

Firstly, in step S1201, when the CPU 2001 receives the print data from the PC 1005 via the network I/F 2010, the processing proceeds to step S1202, and the CPU 2001 extracts a document name, the job owner name, print settings, and the like, which are added to the received print data. Note, the information extracted in step S1202 may be other than this; for example it may include identifier information of an application that transmitted the print data, or a type of the PDL language. Also, it may include the identifier information that the printer driver of the PC 1005 added, or the like.

Next, the processing proceeds to step S1203, and the CPU 2001 determines whether or not the setting stored in the RAM 2002 is a setting for forcibly saving the print data. Note, whether or not this is forcibly saved is determined in accordance with the setting value set in the screen of FIG. 13.

Figure 13:
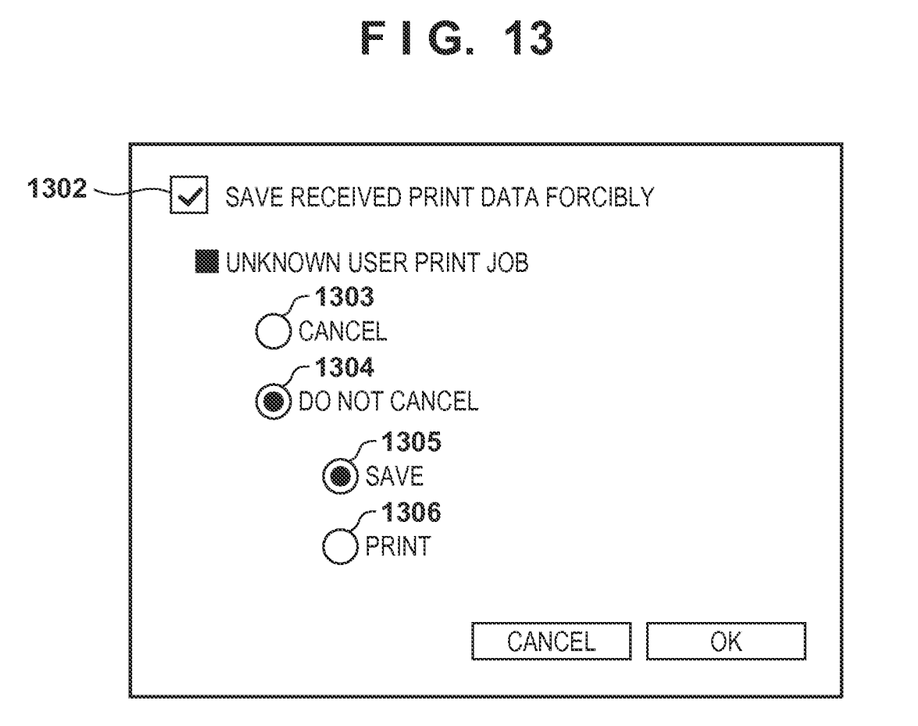
FIG. 13 is a view for illustrating an example of a setting screen according to a fifth embodiment.

FIG. 13 is a view for showing an example of a setting screen according to the fifth embodiment.

A check box 1302 is for setting whether or not to save received print data forcibly, and when this is checked, it is set so that the received print data is saved forcibly. Also, buttons 1303-1306 are buttons for setting a processing method for a print job of an indefinite user. The button 1303 sets so that the print job is cancelled. The button 1304 sets so that the print job is not cancelled. The button 1305 sets so that the print job is saved. The button 1306 sets so that the print job is printed. In the example of FIG. 13, it is set so that the received print data is forcibly saved, and set so that a print job of an indefinite user is saved without cancelling. Note, these setting values are set beforehand by an administrator, stored in the HDD 2004, and read out into the RAM 2002 when the copying machine 1001 activates. The CPU 2001 determines in accordance with the setting value read out into the RAM 2002.

In step S1203, in a case where the CPU 2001 determines that the print data is not saved forcibly, the processing proceeds to step S1209, the CPU 2001 controls the printer 2095, generates the image data based on the received print data, prints an image on a sheet, and the processing completes.

On the other hand, in step S1203, the CPU 2001, in a case where it is determined that the print data is saved forcibly, the processing proceeds to step S1204. In step S1204, the CPU 2001 analyzes the information added to the print data extracted in step S1202, and determines whether or not identification of the job owner name of the received print data is possible. Specifically, in a case where user identifier information for identifying the user is not included in the information extracted in step S1202, it is determined in step S1204 that the answer is YES because the owner name of the print job is unknown, and the processing proceeds to step S1205. Note, the determination of step S1204 may be executed by a method other than determining based on the existence or absence of user identifier information. For example, YES may be determined in step S1204 in cases where user identifier information is included, and the user identifier information is not analyzable, and where there is a user who does not have an authorization to log in to the copying machine 1001.

In step S1205, the CPU 2001 determines whether or not to cancel the printing of print data for which the owner name is unknown. Note, here, the setting of whether or not to cancel the printing is determined in accordance with the setting of the button 1303 of the screen of FIG. 13. This setting value is set beforehand by the administrator, is stored in the HDD 2004, and is read out into the RAM 2002 when the copying machine 1001 activates. The CPU 2001 determines to cancel the printing of print data for which the job owner name is unknown in cases where a setting value of button 1303 read out into the RAM 2002 is valid. In step S1205, in a case where the CPU 2001 determines to cancel the print job, the processing proceeds to step S1210, and a CPU 2001 discards the received the print data, and as well as writing an error log to the HDD 2004, prints an error report with the printer 2095. The error report includes such things as an error code indicating a type of the error, a received date time, and bibliographic information (the document name, etc.). Also, configuration may be taken such that other than these, a message such as "cannot print or save because the user is unknown", for example, may be included.

On the other hand, in step S1205, in a case where the CPU 2001 determines not to cancel the printing of the print data for which the job owner name is unknown, the processing proceeds to step S1206, and the CPU 2001 determines whether to print or whether to save the print data. Note, the settings for whether to print and whether to save print data for which the job owner name of the user is unknown are determined in accordance with settings for the buttons 1304-1306 in FIG. 13. In cases where, in step S1206, the CPU 2001 determines that it is set so as to print without cancelling a print job for which the user is indefinite, the processing proceeds to step S1209, and the CPU 2001 prints the image based on the received print data by controlling the printer 2095. On the other hand, in cases where, in step S1206, the CPU 2001 determines that it is set so as to save, the processing proceeds to step S1207.

Meanwhile, in a case where it is determined that the job owner name is identifiable in step S1204, the processing proceeds to step S1207. In step S1207, the CPU 2001 saves the print data received in step S1201 into the HDD 2004. Then, the processing proceeds to step S1208, and the CPU 2001 saves the bibliographic information extracted in step S1202 into the HDD 2004, and the processing completes.

As explained above, by virtue of the fifth embodiment, it is possible to designate whether to cancel the print job or whether to print or save in accordance with the print job in cases where the job owner name (document inputter) included in the received print data is not analyzable.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-098000, filed May 7, 2013, and Japanese Patent Application No. 2013-248338, filed Nov. 29, 2013 which are hereby incorporated by reference herein in their entirety.

What is claimed is:

1. An image forming apparatus, comprising:
   a storage unit configured to store print jobs transmitted from an external apparatus, at least one of the print jobs having a job owner name;
   a display unit configured to display a print job list of the print jobs stored in the storage unit;
   a print unit configured to execute a print process on a print job which is selected from the print job list displayed by the display unit, on the basis of a print start instruction of a login user who logs in to the image forming apparatus; and
   a determination unit configured to determine whether or not to store an unknown user print job which is transmitted from the external apparatus, the unknown user print job having an unknown job owner name or no job owner name,
   wherein, in a case where it is determined to store the unknown user print job, the unknown user print job is caused to be stored in the storage unit and is displayed in the print job list, and
   wherein, in a case where it is determined not to store the unknown user print job, a print process on the unknown user print job is executed by the print unit without the print start instruction of the login user.

2. The image forming apparatus according to claim 1, wherein
   the print job list further includes information of a name of the print job, and a date time when the print job is received.

3. The image forming apparatus according to claim 1, further comprising:
a generation unit configured to generate a history of a print job including at least a user name of the login user, and a job owner name of the print job, in accordance with execution of the print job by the print unit.

4. The image forming apparatus according to claim 1, further comprising a deletion unit configured to delete a print job selected from the print job list displayed by the display unit.

5. A non-transitory storage medium storing a program for causing a computer to function as the image forming apparatus according to claim 1.

6. A printing system including a printing apparatus, and an information processing apparatus that stores a list of print jobs, wherein
the printing apparatus comprises:
a storage unit configured to store print jobs transmitted from the information processing apparatus, at least one of the print jobs having a job owner name;
a display unit configured to display a print job list of the print jobs stored in the storage unit;
a print unit configured to execute a print process on a print job which is selected from the print job list displayed by the display unit, on the basis of a print start instruction of a login user who logs in to the printing apparatus; and
a determination unit configured to determine whether or not to store an unknown user print job which is transmitted from the information processing apparatus, the unknown user print job having an unknown job owner name or no job owner name,
wherein, in a case where it is determined to store the unknown user print job, the unknown user print job is caused to be stored in the storage unit and is displayed in the print job list, and
wherein, in a case where it is determined not to store the unknown user print job, a print process on the unknown user print job is executed by the print unit without the print start instruction of the login user, and
the information processing apparatus comprises:
a transmission unit configured to transmit to the printing apparatus a print job.

7. A method of controlling an image forming apparatus, the method comprising:
storing print jobs transmitted from an external apparatus in a memory, at least one of the print jobs having a job owner name;
displaying on a display unit a print job list of the print jobs stored in the memory;
executing a print process on a print job which is selected from the print job list displayed in the displaying, on the basis of a print start instruction of a login user who logs in to the image forming apparatus; and
determining whether or not to store an unknown user print job which is transmitted from the external apparatus in the memory, the unknown user print job having an unknown job owner name or no job owner name,
wherein, in a case where it is determined to store the unknown user print job, the unknown user print job is stored in the memory and is displayed in the print job list, and
wherein, in a case where it is determined not to store the unknown user print job, a print process on the unknown user print job is executed without the print start instruction of the login user.

* * * * *